(12) United States Patent
Codega et al.

(10) Patent No.: US 9,964,138 B2
(45) Date of Patent: May 8, 2018

(54) CARABINER WITH WIRE LEVEL FOR CLIMBING

(71) Applicant: CAMP S.p.A., Premana (IT)

(72) Inventors: Antonio Codega, Premana (IT);
Matteo Rivadossi, Premana (IT)

(73) Assignee: CAMP S.p.A., Premana (LC) (IT)

( * ) Notice: Subject to any disclaimer, the term of this patent is extended or adjusted under 35 U.S.C. 154(b) by 230 days.

(21) Appl. No.: 14/491,130

(22) Filed: Sep. 19, 2014

(65) Prior Publication Data
US 2015/0074960 A1 Mar. 19, 2015

(30) Foreign Application Priority Data
Sep. 19, 2013 (IT) .............................. MI2013A1543

(51) Int. Cl.
*F16B 45/02* (2006.01)
(52) U.S. Cl.
CPC ......... *F16B 45/02* (2013.01); *Y10T 24/45361* (2015.01)
(58) Field of Classification Search
CPC ......... Y10T 24/45319; Y10T 24/45236; Y10T 24/45272; Y10T 24/45335; Y10T 24/4534;
(Continued)

(56) References Cited

U.S. PATENT DOCUMENTS 1,849,816 A * 3/1932 Yingling ................... B66C 1/36
114/221 R
2,271,784 A * 2/1942 Tritt ..................... A47B 96/061
211/123
(Continued)

FOREIGN PATENT DOCUMENTS

BZ 2012BZO000002 12/2013
EP 989312 A1 * 3/2000 .............. F16B 45/02
(Continued)

OTHER PUBLICATIONS

Italian Search Report for related Italian Application No. MI2013A001543, dated Jun. 4, 2014.
(Continued)

*Primary Examiner* — Jason W San
(74) *Attorney, Agent, or Firm* — Meunier Carlin & Curfman LLC

(57) ABSTRACT

The present invention relates to a carabiner, particularly a wire carabiner, for mountaineering and climbing comprising a ring having a side, which is interrupted by an opening defined by a first and a second end, wherein said opening is closed by a spring closing member that may take an open position and a closed position, wherein the first end of the ring comprises a bulb-shaped coupling portion, with the part projecting in the transversal direction with respect to the plane of the carabiner, and wherein the closing member is of the so-called "wire lever" type and comprises a lever member consisting of a metal wire, wherein said lever member is associated with a coupling member with the coupling portion of the ring, said coupling member comprising a seat, having such shape and dimensions as to couple with said coupling portion, and a constraint portion to the lever member.

6 Claims, 3 Drawing Sheets

(58) Field of Classification Search
CPC ......... Y10T 24/45361; Y10T 24/45366; Y10T 24/45414; Y10T 24/45435; Y10T 24/45445; Y10T 24/49826; Y10T 24/49947; F16B 45/02
USPC ...... 24/428, 598.1, 598, 599.1, 601.5, 599.9
See application file for complete search history.

(56) References Cited

U.S. PATENT DOCUMENTS

| | | | | |
|---|---|---|---|---|
| 3,083,431 | A * | 4/1963 | Lewis | B66C 1/36 24/599.7 |
| 3,827,746 | A * | 8/1974 | Byers | B66C 1/36 24/599.5 |
| 4,499,634 | A * | 2/1985 | Zimmardi | A44C 5/2033 24/116 A |
| 5,820,181 | A * | 10/1998 | Le Noach | B63B 21/54 24/599.1 |
| 5,913,479 | A * | 6/1999 | Westwood, III | B66C 1/36 24/298 |
| 5,937,490 | A * | 8/1999 | Mihailovic | F16B 45/02 24/599.4 |
| 6,519,818 | B1 * | 2/2003 | Chang | B66C 1/36 24/599.4 |
| 6,772,488 | B1 * | 8/2004 | Jensen | F16B 45/02 24/598.6 |
| 8,572,819 | B2 * | 11/2013 | Yang | F16B 45/02 24/599.5 |
| 8,763,216 | B2 * | 7/2014 | Codega | F16B 45/02 24/599.4 |
| 9,638,237 | B2 * | 5/2017 | Yeh | F16B 45/02 |
| 2001/0037543 | A1 * | 11/2001 | Matoba | F16B 45/02 24/600.9 |
| 2002/0050032 | A1 * | 5/2002 | Carnall | F16B 45/02 24/600.2 |
| 2004/0036303 | A1 * | 2/2004 | Yu | F16B 45/02 294/82.19 |
| 2005/0011058 | A1 * | 1/2005 | Simond | B66C 1/36 24/599.1 |
| 2006/0174458 | A1 * | 8/2006 | Carnall | F16B 45/02 24/600.2 |
| 2007/0214616 | A1 * | 9/2007 | Peterson | F16B 45/02 24/599.1 |
| 2008/0022497 | A1 * | 1/2008 | Thompson | F16B 45/02 24/598.1 |
| 2008/0185848 | A1 * | 8/2008 | Coulombe | F16B 45/02 292/1 |
| 2009/0158899 | A1 * | 6/2009 | Eisenbraun | A45C 15/00 81/3.09 |
| 2009/0183347 | A1 * | 7/2009 | Abels | F16B 45/02 24/599.6 |
| 2010/0125984 | A1 * | 5/2010 | Petzl | F16B 45/02 24/599.6 |
| 2011/0023275 | A1 * | 2/2011 | Thompson | F16B 45/02 24/594.1 |
| 2011/0138586 | A1 * | 6/2011 | Gompert | F16B 45/02 24/599.4 |
| 2012/0297590 | A1 * | 11/2012 | Spataro | F16B 45/02 24/599.9 |
| 2013/0025095 | A1 * | 1/2013 | Yang | F16B 45/02 24/599.5 |
| 2013/0036579 | A1 * | 2/2013 | Christianson | F16B 45/02 24/600.1 |
| 2013/0212841 | A1 * | 8/2013 | Castaline | A44B 19/262 24/429 |
| 2013/0219673 | A1 * | 8/2013 | Perner | F16B 45/02 24/375 |
| 2013/0232741 | A1 * | 9/2013 | Liang | F16B 45/02 24/600.2 |
| 2014/0115840 | A1 * | 5/2014 | Liang | F16B 45/02 24/600.2 |
| 2014/0317892 | A1 * | 10/2014 | Yoo | F16B 45/00 24/346 |
| 2014/0373319 | A1 * | 12/2014 | Lin | F16B 45/02 24/599.5 |
| 2015/0009618 | A1 * | 1/2015 | Hsieh | F16B 45/02 361/679.32 |
| 2015/0069206 | A1 * | 3/2015 | Sakuma | A47G 25/0607 248/552 |
| 2015/0074959 | A1 * | 3/2015 | Codega | F16B 45/02 24/599.9 |
| 2015/0353327 | A1 * | 12/2015 | Hoover | F16B 45/02 294/82.2 |
| 2016/0037869 | A1 * | 2/2016 | Adelman | A44B 15/00 24/531 |
| 2016/0061251 | A1 * | 3/2016 | Rogelja | F16B 45/02 24/598.3 |

FOREIGN PATENT DOCUMENTS

| | | |
|---|---|---|
| EP | 1178227 A1 | 2/2002 |
| EP | 2034198 A1 | 3/2009 |

OTHER PUBLICATIONS

EPO Communication Pursuant to Rule 114(2) EPC, dated Jun. 26, 2016, concerning Third Party Observation filed by Benno Vinatzer before the European Patent Office in connection with corresponding European Patent Application No. EP14184744.2, and exhibits/attachments thereto, 51 pages (inclusive of English translation).

* cited by examiner

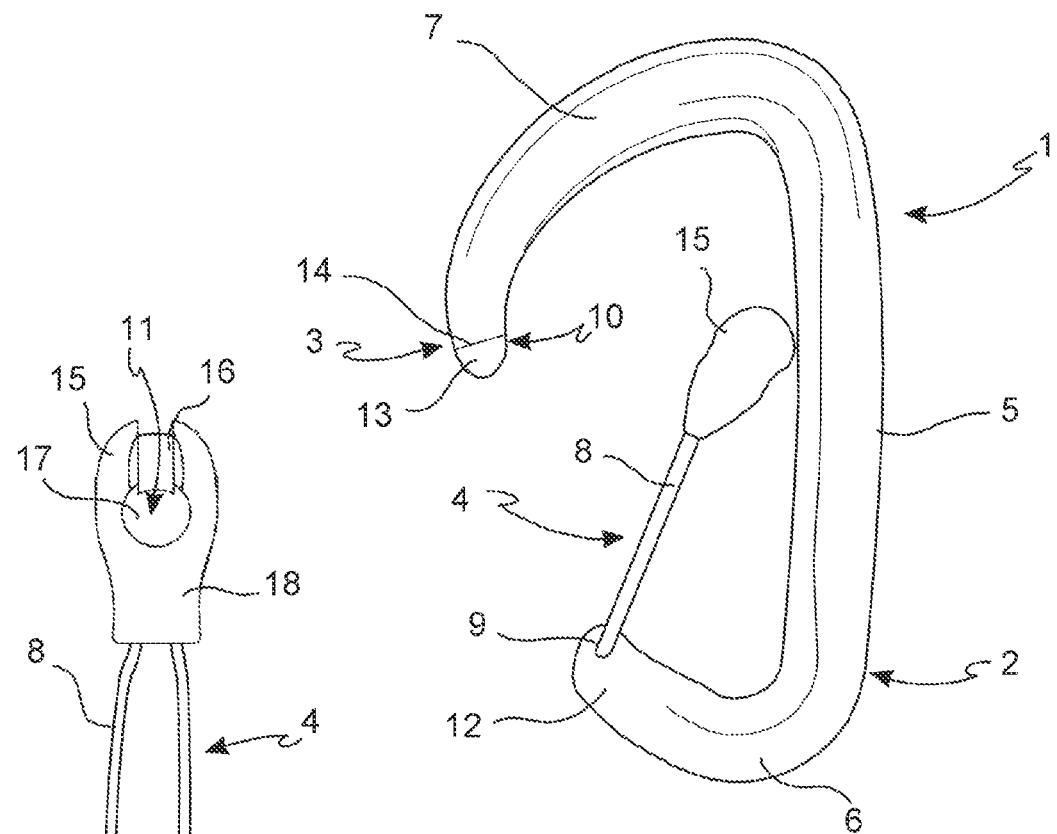
FIG. 1
FIG. 1A
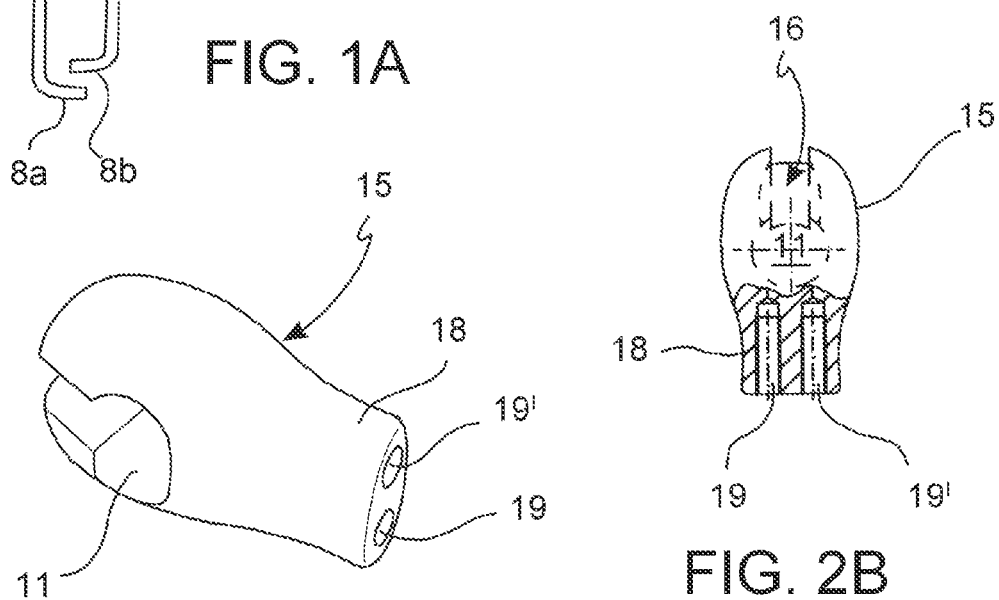
FIG. 2A
FIG. 2B

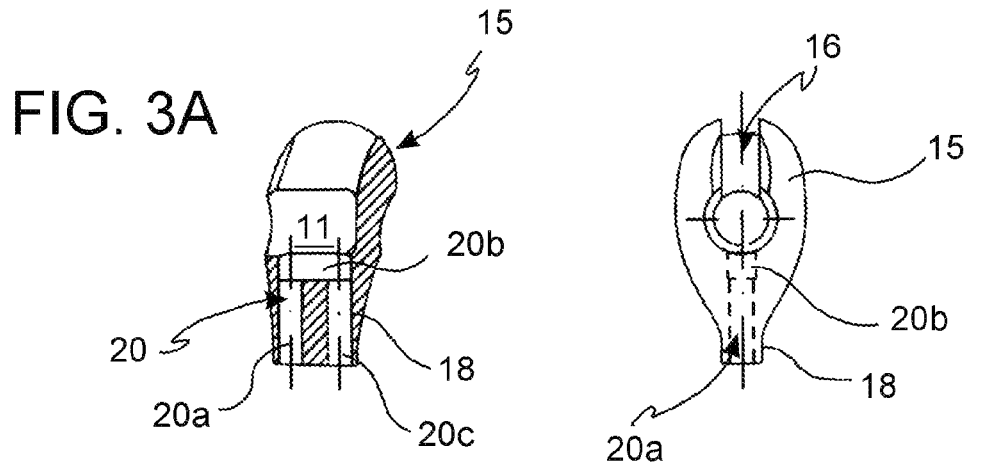
FIG. 3A
FIG. 3B
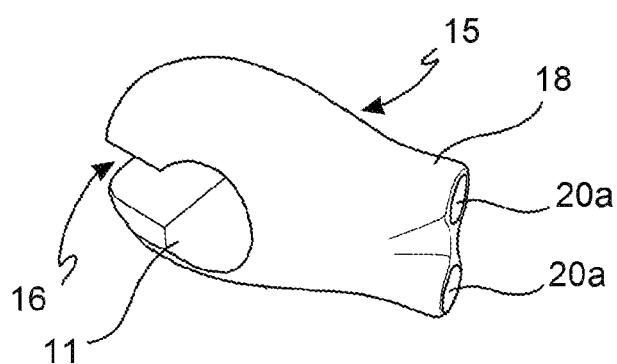
FIG. 4
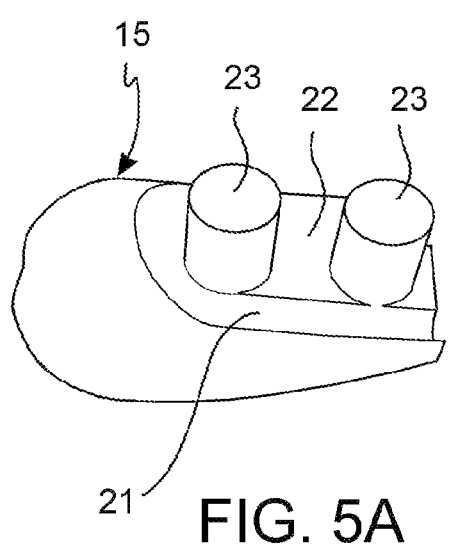
FIG. 5A
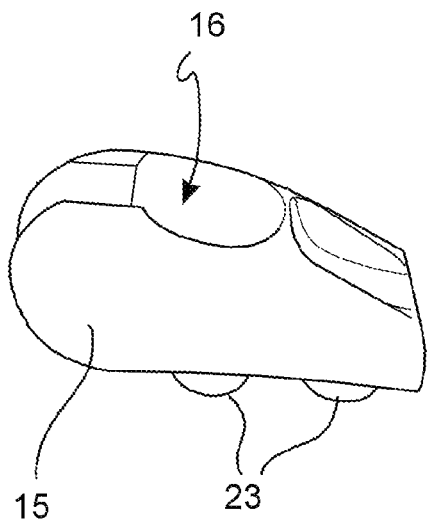
FIG. 5B

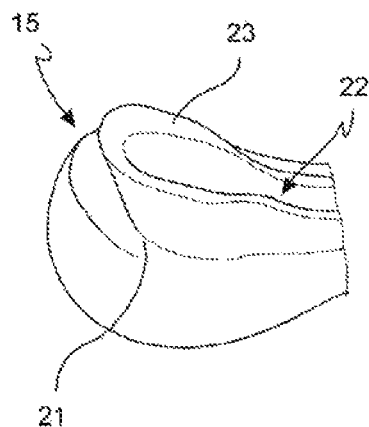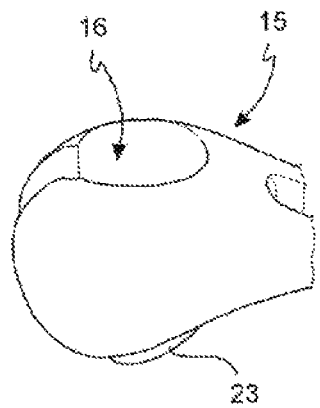
FIG. 6A  FIG. 6B
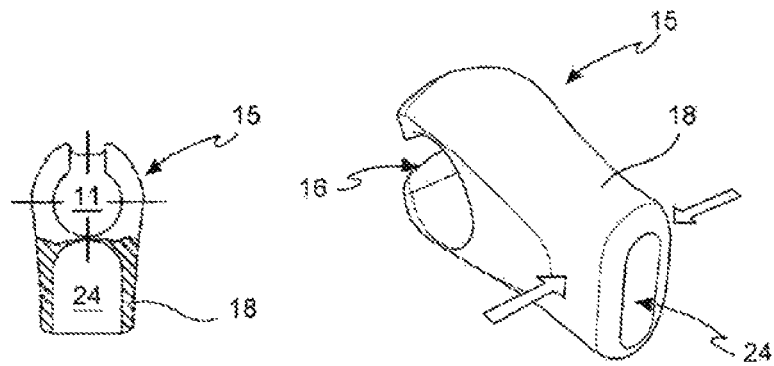
FIG. 7A  FIG. 7B
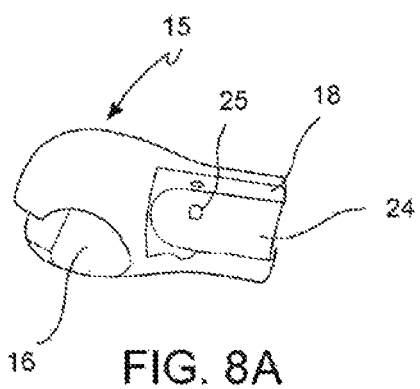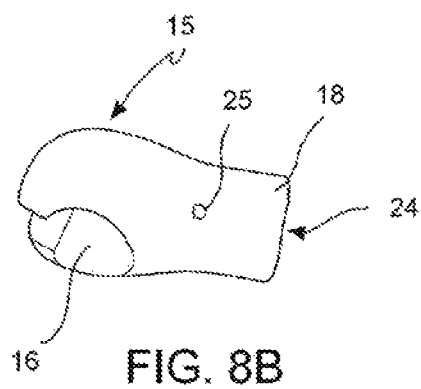
FIG. 8A  FIG. 8B

CARABINER WITH WIRE LEVEL FOR CLIMBING

CROSS-REFERENCE TO RELATED APPLICATIONS

This application claims the benefit of Italian Patent Application No. MI2013A001543, filed on Sep. 19, 2013, the disclosure of which is expressly incorporated herein by reference in its entirety.

The present invention relates to a carabiner, particularly a carabiner with wire lever, for mountaineering and climbing.

There are several types of carabiners for mountaineering and climbing. A first type is the one of the ferrule carabiners, usable particularly for coupling the climbing harness. In addition, there are the lever or wire carabiners, which are typically used for quick draws. In all cases, the carabiners have to be resistant to the opening, both accidental and when the carabiner is under load, as, for example, it occurs in the case of a fall. In fact, when the carabiner is under a load, it tends to elongate, with the risk to create a gap between the movable end of the lever and the contact point thereof with the carabiner ring.

In order to obviate this drawback, carabiners are used, comprising a kind of hook to which the lever end couples. Although this solution is able to increase the climber's safety, the hook may hinder the rope withdrawal, by coupling thereto, therefore making its withdrawal from the carabiner difficult during some climbing stages.

Therefore, the so-called "key-lock" securing system has been proposed, consisting in a T-shaping of the ring coupling end according to a section transversal with respect to the plane in which the carabiner lays. Consequently, the lever will have a complementarily-shaped coupling head, so as to implement a shape coupling. This securing system avoids the hook effect of the traditional lever carabiners and ensures an acceptable safety level against an accidental opening, even if the opening risk is not yet prevented.

The known alternative to decrease the risk of opening the lever is to use a wire lever. This decreases the lever inertial mass, thus reducing possible risks of an accidental opening; however, in this manner it is inevitable that the closure is hook-shaped.

The problem underlying the present invention is to provide a carabiner of the "wire lever" type which further improves the opening resistance when the carabiner is under a load and that prevents the interference problem between the hook closure and the rope during the withdrawal thereof.

Such a problem is solved by a carabiner as set forth in the appended claims, the definitions of which are an integral part of the present invention.

Further characteristics and advantages of the present invention will be more clearly apparent from the description of a preferred embodiment, given herein below by way of illustrative, non-limiting example, with reference to the following figures, in which:

FIG. 1 represents a plan view of the carabiner of the invention;

FIG. 1A represents a front view of a detail of the carabiner of FIG. 1;

FIG. 2A represents a perspective view of a different detail of the carabiner of FIG. 1;

FIG. 2B represents a sectional view of the detail of FIG. 2A;

FIG. 3A represents a sectional side view of a detail of the carabiner of FIG. 1 according to a different embodiment;

FIG. 3B represents a sectional front view of the detail of FIG. 3A;

FIG. 4 represents a perspective view of a detail of the carabiner of the invention according to a third embodiment;

FIG. 5A represents a perspective view of a side of a detail of the carabiner of the invention according to a fourth embodiment;

FIG. 5B represents a perspective view of the opposite side of the detail of FIG. 5A;

FIG. 6A represents a perspective view of a side of a detail of the carabiner of the invention according to a fifth embodiment;

FIG. 6B represents a perspective view of the opposite side of the detail of FIG. 6A;

FIG. 7A represents a sectional front view of a detail of the carabiner of the invention according to a sixth embodiment;

FIG. 7B represents a perspective view of the detail of FIG. 7A;

FIG. 8A represents a sectioned perspective view of an eighth embodiment of a detail of the carabiner of the invention.

FIG. 8B represents a perspective view of the eighth embodiment of the carabiner of the invention.

Referring to the figures, the carabiner according to the invention, generally indicated by the number 1, comprises a ring 2 having a first side 3 which is interrupted by an opening defined by a first 10 and a second 12 end. The opening is closed by a spring closing member 4 that may take an open position, to allow inserting into the carabiner 1 a rope or a ring of a different device, and a closed position, in which the closing member 4 closes the ring 2 of the carabiner, preventing the said rope or ring of the different device from exiting.

In an embodiment, the ring 2 has a first and a second side 3, 5 which are convergent and connected by a first and a second loop 6, 7, wherein the first loop 6 has a curvature radius that is less than that of the second loop 7.

The first end 10 of the ring 2 comprises a coupling portion 13. The coupling portion 13 is bulb-shaped, with the part projecting in the transversal direction with respect to the plane of the carabiner 1. In this manner, a hook effect for the rope passing into the carabiner is prevented.

Therefore, the bulb-shaped coupling portion 13 comprises a shoulder 14 on both sides of the bulb. The shoulder 14 may have a planar surface, as shown in the figure, or even a non-planar surface, such as, for example, a convex shape with a continuous or a broken line profile.

The closing member 4 is of the so-called "wire lever" type, and comprises a lever member 8, consisting in a metal wire, particularly steel, which is folded to form a lever and having two ends 8a, 8b with axes that are mutually parallel and offset (FIG. 1A) so as to be able to be inserted into the corresponding holes 9 present on the second end 12 of the ring 2, so as to create the spring effect for the return of the lever upon the carabiner closing.

The end of the lever member 8 that is opposite the holes 9 is associated to a coupling member 15 with the coupling portion 13 of the ring 2.

The coupling member 15 comprises a seat 11, having such shape and dimensions as to allow inserting the coupling portion 13 of the first end 10 of the first side 3 and the abutment stop thereof within said seat 11, and a constraint portion 18 to the lever member 8.

As shown in the figures, the seat 11 comprises a vertical groove 16 for inserting the first end 10, and an abutment side surface 17.

The seat 11 and the corresponding vertical groove 16 have a shape that is complementary to that of the coupling portion 13 with which they are intended to couple, i.e., in the embodiment of the figures, a bulb-shaped profile.

In a first embodiment, shown in the FIGS. 2A and 2B, the constraint portion 18 of the coupling member 15 comprises two threaded holes 19, 19', while the lever member 8 consists in two metal wires in which the ends opposite the opposite ends 8*a*, 8*b* are also threaded, so as to be able to be threaded into said holes 19, 19'.

In a second embodiment, shown in the FIGS. 3A and 3B, the constraint portion 18 of the coupling member 15 comprises a channel 20 having two parallel lengths 20*a* and a joining transversal length 20*b*. The metal wire of the lever member 8, suitably folded to form the lever, is inserted from above (i.e., from the seat 11), thus the constraint portion 18 is subjected to a compression to establish the coupling. A similar embodiment is shown in FIG. 4, wherein the channel 20 is arranged transversally with respect to the plane passing through the groove 16.

In a different embodiment, shown in the FIGS. 5A and 5B, the coupling member 15 comprises, on the face opposite the one in which the vertical groove 16 opens, a loop track 21, in which the folded metal wire of the lever member 8 is passed, and a central portion 22 comprising securing members 23 of the lever member 8. In the embodiment of such figures, the securing members 23 consist in two small cylinders that are riveted together with the outer edges of the loop track 21 so as to lock the lever member 8. In a similar embodiment, shown in the FIGS. 6A and 6B, the securing members 23 consist in the same edges dividing the central portion 22 from the track 21, and which in this case turn out to be larger.

In a further embodiment, shown in the FIGS. 7A and 7B, the constraint portion 18 of the coupling member 15 comprises a pocket 24 in which the lever member 8 is inserted. Then the latter is locked within the pocket 24 by compressing the constraint portion 18 as shown by the arrows in FIG. 7B. In a similar embodiment, shown in FIGS. 8A and 8B, the walls of the constraint portion 18 at the pocket 24 comprise through holes 25 so aligned as to allow inserting a securing pin (not shown) before or after locking by compression as described above.

Therefore, the carabiner according to the invention achieves the predetermined object to ensure a high resistance to accidental opening, while preventing a hook effect on the rope passing into the carabiner during the withdrawal thereof. This is obtained by virtue of the fact that a wire lever, the low inertial mass of which decreases the risks of an accidental opening thereof, and helps keeping it closed, is combined to a coupling member 15 of the "key-lock" type, couplabe to an end 10 of the side 3 of the ring 2 which will be thus able to be shaped as a transversal bulb, instead of being hook-shaped.

The carabiner of the invention is easy to be manufactured, light-weighted, and cost-effective.

It is apparent that the one that has been described is only a particular embodiment of the present invention, to which those skilled in the art will be able to make all those modifications that are necessary for the adaptation thereof to particular conditions, without anyway departing from the claimed protection scope.

The invention claimed is:

1. A carabiner comprising a ring having a side, which is interrupted by an opening defined by a first and a second end, wherein said opening is closed by a spring closing member that may take an open position and a closed position, wherein the first end of the ring comprises a bulb-shaped coupling portion, the bulb-shaped coupling portion projecting in the transversal direction with respect to a plane parallel to the ring of the carabiner, and wherein the closing member comprises a lever member comprising metal wire, and of a coupling member configured to couple with the bulb-shaped coupling portion of the ring, wherein the lever member comprises a fixed end and a free end, and the coupling member comprises a proximal end that is proximal to the free end of the lever member and a distal end that is distal to the free end of the lever member, the proximal end and the distal end of the coupling member being opposite and spaced apart from each other, the coupling member further comprising an interior face facing an interior of the ring, and an exterior face facing away from the interior of the ring and toward the bulb-shaped coupling portion, the exterior face and the interior face being opposite and spaced apart from each other, the proximal end of the coupling member being permanently affixed and attached to the free end of the lever member, the exterior face of the coupling member defining a bulb-shaped seat comprising a vertical groove and a substantially shaped spherical portion, the vertical groove extending from the distal end of the coupling member and toward the proximal end of the coupling member, wherein the vertical groove terminates at the substantially spherical shaped portion at a distal end of the vertical groove, the substantially spherical shaped portion extending from the distal end of the vertical groove toward the proximal end of the coupling member and terminating at a point spaced apart from the proximal end of the coupling member, the substantially spherical shaped portion having an abutment side surface that is disposed between and spaced apart from the interior face of the coupling member and the exterior face of the coupling member, the abutment side surface not being visible from the interior face of the coupling member, and wherein the bulb-shaped seat has such shape and dimensions as to receive said bulb-shaped coupling portion therein, and the proximal end of the coupling member comprising a constraint portion, the constraint portion comprising a pocket for receiving the free end of the lever member therein and wherein the free end of the lever member is affixed and attached by compressing the constraint portion.

2. The carabiner according to claim 1, wherein the pocket of the constraint portion comprises a channel having two parallel lengths and a joining transversal length, the metal wire of the lever member being housed in said channel and secured therein by compressing the constraint portion.

3. The carabiner according to claim 2, wherein the channel is arranged transversally with respect to a plane passing through the vertical groove.

4. The carabiner according to claim 1, wherein the constraint portion at the pocket comprises aligned through holes.

5. The carabiner according to claim 1, wherein said bulb-shaped coupling portion comprises a shoulder, wherein the shoulder has a planar, convex surface with a continuous line profile, or convex surface with a broken line profile.

6. The carabiner according to claim 4, wherein the aligned through holes are disposed respectively on the interior face and the exterior face of the coupling member.

* * * * *